Aug. 2, 1966   A. R. J. FRIEDMANN ETAL   3,263,930
IRRIGATION SPRINKLER
Filed Sept. 11, 1964
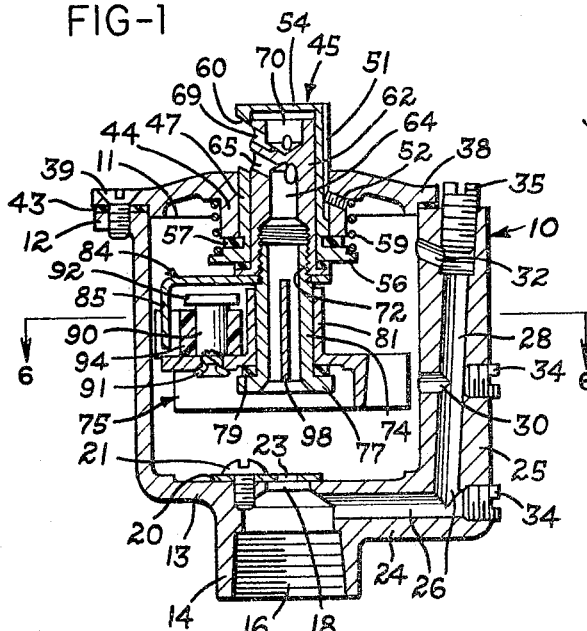
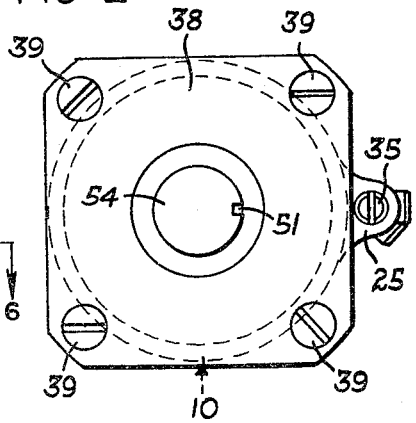
INVENTORS
ANTON R. J. FRIEDMANN &
BY MICHAEL DEMIDO
Marechal, Biebel, French & Bugg
ATTORNEYS

United States Patent Office 3,263,930
Patented August 2, 1966

3,263,930
IRRIGATION SPRINKLER
Anton R. J. Friedmann and Michael Demido, Troy, Ohio, assignors to The Skinner Irrigation Company, a corporation of Ohio
Filed Sept. 11, 1964, Ser. No. 395,814
9 Claims. (Cl. 239—206)

This invention relates to irrigation sprinklers, and more particularly, to a pop-up sprinkler having a rotary nozzle unit for distributing liquid in a concentrated spray over a predetermined area.

The invention has particular reference to an improved sprinkler for lawns and the like which is adapted to be recessed into the ground so that when inoperative, no portion of the sprinkler extends above ground level to interfere with moving of the surrounding grass or detract from the aesthetic appearance of the lawn. On the other hand, when water under pressure is supplied to the sprinkler the rotary nozzle unit is adapted to pop-up and distribute a concentrated spray of liquid over an adjacent area which may be defined by a full circle or a sector thereof. Commonly, a series of the sprinklers are spaced apart in such a manner to provide a combined spray coverage which will uniformly irrigate an area of several acres or more.

Primarily, the present invention is directed to a pop-up type sprinkler having a construction which will provide many years of maintenance-free service and will not be subject to jamming by sand or dirt particles dropping into the sprinkler. The invention is further directed to a rotary pop-up sprinkler which can be easily adjusted after installation for a specific speed of step-by-step rotation depending upon the flow concentration desired on the area which is covered by the sprinkler. This exterior control over the speed of step-by-step rotation of the nozzle has been found to be a highly desirable feature since each sprinkler can be set after installation in the ground, and during operation, according to the supply line pressure which may vary significantly over an entire irrigation system, depending upon the particular arrangement of the supply lines. Furthermore, in view of the tolerances which must be allowed for economical manufacturing of the sprinkler, it is difficult to predetermine the exact speed of rotation prior to testing. Thus, each sprinkler may be adjusted so that the spray nozzles of all the sprinklers will rotate at substantially the same desired speed and will produce substantially a uniform concentrated flow of water over the entire area being irrigated.

Accordingly, it is a primary object of the present invention to provide a rotary pop-up sprinkler wherein the speed of step-by-step rotation of the rotary components of the sprinkler can be easily and conveniently adjusted from the top side of the sprinkler during operation and therefore, without requiring disassembly of the sprinkler.

As another object, the present invention provides a rotary pop-up sprinkler as outlined above which is adapted to spray only a portion of a full circle and is hydraulically balanced to prevent wear of the components of the sprinkler over an extended period of use.

Still another object of the present invention is to provide a rotary pop-up sprinkler as outlined above wherein the water operated mechanism for imparting successive impacts to the nozzle member for creating a step-by-step motion of the nozzle includes a pivotally mounted striker member which is formed from a plastic material having a high resistance to impact and wear.

It is also an object of the present invention to provide a rotary pop-up sprinkler as outlined above wherein the pop-up spray head is adapted to retract to an inoperative position such that the top of the spray head is substantially flush with the top of the sprinkler and is so constructed to prevent dirt, sand and the like from seeping into the sprinkler to cause jamming and clogging.

Other objects and advantages of the invention will be apparent from the following description, the accompanying drawing and the appended claims.

In the drawing—

FIG. 1 is an elevational view in axial section of a part circle pop-up sprinkler constructed in accordance with the invention showing the spray head extended in the operable position;

FIG. 2 is a top plan view of the pop-up sprinkler of FIG. 1 showing the flow control adjustment screw for setting the speed of step-by-step rotation of the sprinkling head in accordance with the invention;

FIG. 3 is a partial elevational view of axial section of a full circle sprinkler constructed in accordance with the invention;

FIG. 4 is a perspective view of the mechanism which produces the successive impulses for rotating the sprinkler head in accordance with the invention;

FIG. 5 is a top plan view of the mechanism of FIG. 4 showing the relationship between the freely rotating impeller and the pivotally mounted striker member which imparts the successive impacts for rotating the sprinkler head in accordance with the invention;

FIG. 6 is a plan sectional view of the sprinkler housing as viewed along the line 6—6 of FIG. 1, showing the adjustable flow plate for controlling, in part, the amount of liquid which is distributed by the sprinkler according to the invention, and which is preset according to whether the sprinkler has a full or part circle coverage;

FIG. 7 is an elevational view of a nozzle head constructed for a part circle sprinkler in accordance with the invention; and FIG. 8 is an elevation view of a nozzle head constructed for a full circle sprinkler in accordance with the invention.

Referring to the drawing, which illustrates preferred embodiments of the invention, the water sprinkler constructed in accordance with the invention includes a generally cylindrical housing 10 defining a top opening 11 and including top corner flanges 12. From the bottom 13 of the housing projects a tubular inlet coupling 14 having internal threads 16 for connecting to a suitable water supply line (not shown). Commonly, the supply line is interconnected to a series of similar sprinklers spaced in a pattern throughout the lawn so that all of the sprinklers cooperate to distribute water uniformly over a predetermined area.

Centrally located within the bottom 13 of the housing 10 is an opening 18 which is covered by a flow control plate 20 retained on the bottom of the housing by a screw 21. As shown in FIG. 6, the flow control plate 20 includes a port 23 which is substantially smaller than the opening 18. When the flow control plate 20 is rotated about the screw 21, the flow of water from the supply line directly into the housing 10 may be controlled simply by blocking a portion of the port 23 and thereby controlling, in part, the amount of water distributed by the sprinkler. From experience, it has been found that the flow control plate 20 may be set during assembly of the sprinkler according to whether the sprinkler is constructed to distribute water over a full circle or a sector of a circle. For example, the port 23 may be fully open for a full circle sprinkler, ½ open for a half circle, and ⅓ open for a quarter circle sprinkler.

Formed as an integral part of the housing 10 is a radially extending projection 24 and a longitudinally extending projection 25 which defines an external supply passageway 26 and a bypass passageway 28 which are connected for directing water from the inlet coupling 14 through a driving port 30 and a bypass port 32 and into the chamber formed within the housing 10. The passageways 26 and 28 are formed by a drilling operation and thus, the plugs 34 are provided in the ends of the drilled holes to prevent liquid from escaping and to provide for cleaning of the passageways 26 and 28 and the driving port 30.

Threaded into the top of the bypass passageway 28 is a speed adjusting screw 35 which is adapted to be screwed down into the housing 10 to partially or completely block the bypass port 32. With a substantially constant pressure in the passageway 26, the more the screw 35 blocks the flow through the bypass port 32 the greater the flow will be through the driving port 30. One important feature is that this speed adjusting screw 35 is accessible from above the ground even after the sprinkler has been installed recessed within the ground.

A cover 38 is mounted on top of the housing 10 and is retained thereon by four equally spaced screws 39 which are threaded into the corner flanges 12 extending from the top of the housing 10. A sealing gasket 43 is provided to prevent the liquid under pressure from leaking between the cover 38 and housing 10. Formed as an integral part of the cover 38 and centrally spaced thereon, is a cylindrical hub 44 which supports the pop-up sprinkling mechanism, generally referred to as 45.

As shown in the part circle sprinkler of FIG. 1, the pop-up sprinkling mechanism 45 includes a tubular sleeve 47 which is mounted for vertical sliding movement within the hub 44 and is prevented from rotating therein by a groove 51 formed axially within the exterior surface of the sleeve and which receives a pin 52 projecting inwardly from the hub 44.

As shown in FIG. 1, the tubular sleeve 47 further includes a top cover 54 which is adapted to be positioned substantially flush with the top surface of the cover 38 when the sprinkling mechanism 45 is fully retracted in the inoperative position. As a result of this smooth unrestricted configuration of the top of the sprinkler when the sprinkling mechanism 45 is retracted, there are no gaps or openings in which sand, dirt particles or pebbles could drop and thereby jam or bind the sprinkling mechanism and prevent it from popping up or rotating.

The bottom of the sleeve 47 includes an integrally formed external flange 56 which retains a sealing washer 57 spaced on top of the flange. The washer 57 is adapted to seat against the bottom of the annular hub 44 to limit the upward travel of the sleeve 47 when water under pressure is introduced within the housing 10. Surrounding the hub 44 and spaced between the underneath side of the cover 38 and the flange 56 is a compression spring 59 which cooperates with the weight of the sprinkling mechanism 45 to assure that the mechanism is completely retracted when the flow of water to the sprinkler has been turned off.

Formed within the upper portion of the sleeve 47 is an opening 60, FIGS. 1 and 7, which is formed with sloping top and bottom walls and extends around the periphery of the sleeve 47 by an angular distance which corresponds with the spray coverage desired. For example, if a half circle spray is desired the opening 60 would extend approximately 180° around the sleeve 47. On the other hand, if a quarter circle was preferred the opening 60 would extend substantially 90°. As the sleeve 47 does not rotate within the cover 38, the precise arcuate coverage of the sprinkler is determined by the position of the cover 38 on the housing 10. Thus, once the sprinkler is installed, the arcuate coverage of the sprinkler may be changed simply by removing the four screws 39 and either replacing the sleeve 47 with one having a different width opening 60 or by rotating the cover 38 on the housing 10, which can be done since the screws 39 are spaced equal distances from each other. Preferably, the cover 38 is formed substantially square with flat edges which can be gripped by a suitable wrench for turning or removing in case the cover freezes to the housing 10 after many years of service.

Mounted for free rotation within the sleeve 47 is a nozzle stem 62 defining a central passageway 64. Water flows through the passageway 64 to three equally spaced nozzle openings 65 formed within the wall of the stem 62 on an angle with the axis of rotation and slightly below an internal dividing wall 47. Preferably, the opening 60 within the sleeve 47 extends around the periphery of the sleeve by a distance whereby at least one nozzle opening 65 is always in fluid communication with the opening 60. Thus, at no time during the rotation of the stem 62 within the sleeve 47 will all three nozzle openings 65 be blocked by the sleeve 47. As one of the nozzle openings 65 rotates past the edge of the opening 60, another nozzle opening 65 is positioned within the area defined by the opening 60, as shown in FIG. 7. As a result, a uniform flow of water will pass through the central passageway 64 of the stem 62 and the sleeve 47 will not operate as a valve to stop intermittently the flow of water through the opening 60.

Also formed within the top portion of the stem 62 are three pressure release openings 69 which are equally spaced on the top side of the dividing wall 67 directly above the nozzle openings 65, and substantially parallel thereto. A central opening 70 is provided in the top portion of the stem 62 and intersects each of the three openings 69. As a result of this stem construction, water under pressure can pass through the two nozzle openings 65 which are blocked by the sleeve 47 and flow through the slight annular gap provided between the outside of the stem 62 and the inside of the sleeve 47 and enter into the central opening 70 through two of the pressure relief openings 69. This leakage of water is directed out of the opening 69 which is positioned within the opening 60 of sleeve 47.

The advantage of allowing the water to leak from one or more nozzle openings 65 when it is blocked by the sleeve 47 is to equalize substantially the radial forces on the stem 62 so that the stem rotates freely and also to prevent wear on either the outside surface of stem 62 or the inside surface of the sleeve 47.

Furthermore, since some leakage around the outside of the stem 62 can not be stopped due to the necessary construction clearance between the stem 62 and the sleeve 47, it is desirable to direct this leakage in a controlled stream rather than permit the leakage to spray wildly around the sprinkler.

Secured to the bottom of the stem 62 by an internal threaded connection 72 is a tubular stud 74 on which an impeller 75 is mounted for free rotation and is retained thereon by head 77 formed as an integral part of the stud 74. A thrust bearing washer 79 is spaced on top of the head 77 and supports the base of the hub 81 of the impeller 75. Inserted within a channel 82, FIG. 4, formed within the bottom of the stem 62 and retained therein by the stud 74 is a radially extending lever or arm 84 which includes a downwardly formed end portion 85 spaced slightly inwardly from the inside surface of housing 10 on a radius substantially the same as the impeller 75. As a result of this assembly, it can be seen that the stem 62, stud 74 and the arm 85 rotates as a unit within the supporting sleeve 47.

As shown in FIGS. 4 and 5, the impeller 75 includes a series of radially extending vanes 88 and a shelf 89 integrally formed between two successive vanes. Extending upward from the shelf 89 is a shouldered pin 90, FIG. 1, which is retained thereon by flaring the end 91. Pivotally mounted on the pin 90 and retained thereon by the head 92, is a deflector or striker 94 having a face 95 which is adapted to strike the vertical portion 85 of the arm 84 upon each revolution of the impeller 75. Preferably, the striker 94 is formed from a plastic material having a high resistance to abrasion and wear, as for example, nylon. Since the engaging face 95 of the striker 94 must be held outwardly into the path of the arm 84, the striker 94 is provided with a cylindrical metal weight 97 which provides sufficient mass to the swinging end of the striker 94 that the engaging face 95 will be held outwardly by centrifugal force as the impeller is rotated in reaction to the jet of water flowing through the driving port 30 against the vanes 88. As a result of the construction and mounting of the striker 94 in the manner described, it has been found that the striker provides dependable and consistent operation over an extended period of use without any visible wear.

Since the impeller 75 is rotatably mounted for free turning on the stud 74, the impeller 75, rotates at substantially a constant speed carrying with it a striker 94. During each revolution of the impeller 75 the striker 94 engages the arm 84 and the free swinging end of the striker is caused to move inwardly and cam itself around the end portion 85 of the arm 84 so that the striker 94 imparts successive nudges or impacts to the arm 84 which, in turn, rotates the nozzle stem 62 in a step-by-step motion.

To vary the speed of this step-by-step rotation the screw 35 is adjusted. When the screw 35 is threaded inwardly, an increasing portion of the bypass port 32 is blocked which, in turn, increases the water flow through the driving port 30 and produces a greater force against the vanes 88 of the impeller 75. As the impeller 75 rotates faster, the centrifugal force on the free swinging end of the striker 94 increases which, in turn, nudges the arm 84 along a greater angular distance in addition to increasing the frequency with which the striker engages the arm 84. As the adjusting screw 35 is unthreaded upwardly, a larger portion of the bypass port 32 is opened which provides for a greater flow of liquid through the bypass port 32 and into the housing 10 in such a manner that is not effective for rotating the impeller 75. Thus, the flow through the driving port 30 is reduced and the rotation of the impeller 75 decreases.

Mounted axially within the tubular stud 74 is a rectifier member 98 which provides for a smooth flow of water without turbulence through the tubular stud 74 such that the spray which is distributed through a nozzle opening 65 is straight and positioned at an angle with respect to the horizontal so that the spray will project over the maximum radial distance from the sprinkler.

Referring to the full circle sprinkler which is shown in FIG. 3, the components of the sprinkler are essentially the same as part circle sprinkler shown in FIG. 1 with the exception that the sleeve 47 has been omitted. In this embodiment of the sprinkler, the cover 102 is provided with a centrally located hub 104 defining an opening in which the full circle nozzle stem 106 is rotatably mounted. As can be seen, the top surface 107 of the nozzle stem 106 is flat and is adapted to remain flush with the top surface of the cover 102 when the water is shut off, in the same manner as described above for the part circle sprinkler of FIG. 1. As also mentioned above, this construction prevents dirt particles, sand and the like from falling into the sprinkler and jamming the operation of the sprinkler.

The nozzle stem 106 is provided with a pair of diametrically opposed nozzle openings 109 which are in fluid communication with the central passageway 110 formed within the nozzle stem 106, in the same manner as described above for the stem 62. In addition, to provide a more uniform spray coverage, a slot 111 is formed on an angle through one of the openings 109 so that the stream is broken-up into a fan and a portion of the water is distributed in the area immediately surrounding the sprinkler. A spring retaining washer 112 is mounted above the bottom flange 114 of the stem 106 and is spaced therefrom by thrust bearing washer 116 so that the spring retaining washer 112 does not rotate with the stem 106. Spaced between the retaining washer 112 and the bottom surface of the hub 104 is a sealing gasket 118 which prevents water from seeping upwardly within the slight annular clearance gap between the stem 106 and the hub 104.

One of the important features of the improved sprinkler in accordance with the invention is the provision for adjusting the speed of step-by-step rotation of the nozzle stem after installation of the sprinkler within the ground. As mentioned above, this can be accomplished simply by adjusting the screw 35 either during operation or when the sprinkler is inoperative, without disassembling the sprinkler. This feature is especially desirable when a series of sprinklers are installed to form an irrigation system which covers a large area of ground. In such a system, the dynamic water pressure may differ throughout the network of supply lines and therefore at the inlet coupling of some of the sprinklers. However, by providing a means for adjusting the rotation of the nozzle head during the operation of the sprinkler, each of the sprinklers may be set to the same rotational speed. Furthermore, it is practically impossible to construct each sprinkler to operate at exactly a predetermined speed of rotation at a given inlet pressure in view of the many dimensional tolerances which are necessary for economical construction. Thus, even when the inlet pressure is uniform throughout a system, it is a desirable feature to be able to adjust the speed of each individual sprinkler so that all of the sprinklers in the system have nozzles rotating at the same speed for uniform spray concentration.

The improved pop-up sprinkler according to the invention also provides the feature on both a full circle sprinkler and a part circle sprinkler when not in operation of a smooth top surface without recessions or openings in which dirt, sand or the like can drop and cause the sprinkling mechanism to jam by preventing it from popping up and/or rotating.

It is also an important advantage of the sprinkler according to the invention that the striker member which imparts the step-by-step rotation to the sprinkling mechanism can be constructed from a plastic material which offers high resistance to wear and abrasion in addition to high impact strength. Furthermore, since the plastic striker 94 only pivots about the pin 92, the rotary motion prevents wear on the striker or pin.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An irrigation sprinkler adapted to be installed within the ground and including a rotary pop-up nozzle and a mechanism for easily adjusting the speed of rotation of the nozzle, comprising a housing having an open top and a bottom including means defining an inlet coupling adapted to be connected to a liquid supply line, a cover for the top of said housing and including a central opening therein, a tubular nozzle stem rotatably mounted within said opening and adapted to pop upwards in response to water pressure within said housing, an impeller, means for mounting said impeller on said stem for free rotation in relation thereto, an arm member rigidly connected to said stem and extending outwardly therefrom, striker means mounted for rotation with said impeller and for imparting successive impulses to said member for intermittently rotating said stem in a step-by-step manner, passageway means for directing liquid from said inlet coupling through a driving port in said housing and towards said impeller for causing rotation thereof, and control means adjustably mounted within said passageway means and having a part accessible from the top of said sprinkler for controlling the flow of liquid through said passageway means and through said driving port toward said impeller for determining the speed of rotation of said impeller.

2. An irrigation sprinkler adapted to be installed within the ground and including a rotary pop-up nozzle and a mechanism for easily adjusting the speed of rotation of the nozzle, comprising a housing having an open top and a bottom including means defining an inlet coupling adapted to be connected to a liquid supply line, a cover for the top of said housing and including a central opening therein, a tubular nozzle stem rotatably mounted within said opening and adapted to pop upwards in response to water pressure within said housing, an impeller horizontally disposed within said housing, means for mounting said impeller to said stem for free rotation in relation thereto, an arm member rigidly connected to said stem and extending radially outwardly therefrom and including a downwardly formed end portion, a plastic striker having a metal weight inserted in an end portion thereof, means for pivotally mounting the opposite end portion of said striker to said impeller to provide for swinging movement of said striker in relation to said impeller, means on said striker for engaging said downwardly formed end portion of said arm member to impart successive impulses to said member for intermittently rotating said stem in a step-by-step manner, passageway means for directing liquid from said inlet coupling through a driving port in said housing and towards said impeller for causing rotation thereof, and an adjustable control means mounted within said passageway means and having a part accessible from the top of said sprinkler for controlling the flow of liquid through said passageway means and through said driving port toward said impeller for determining the speed of rotation of said impeller.

3. An irrigation sprinkler adapted to be installed within the ground and including a rotary pop-up nozzle and a mechanism for easily adjusting the speed of rotation of the nozzle, comprising a housing having an open top and a bottom from which projects an inlet coupling adapted to be connected to a liquid supply line, a cover for the top of said housing and including a central opening therein, a tubular nozzle stem rotatably mounted within said opening and adapted to pop upwards in response to water pressure within said housing, an impeller horizontally disposed within said housing, means for mounting said impeller on said stem for free rotation in relation thereto, an arm member rigidly connected to said stem and extending outwardly therefrom, striker means mounted on said impeller for imparting successive impulses to said member for intermittently rotating said stem in a step-by-step manner, means defining a liquid supply passageway for directing liquid from said inlet coupling through a driving port in said housing and towards said impeller for causing rotation thereof, means defining a by-pass passageway for receiving a portion of the liquid flowing within said supply passageway and for directing said portion into said housing in a manner which is ineffective for rotating said impeller, and control means mounted within said by-pass passageway and accessible from the top of said sprinkler for controlling the flow of liquid through said by-pass passageway and thereby controlling indirectly the flow of liquid through said driving port toward said impeller for determining the speed of rotation of said impeller.

4. An irrigation sprinkler adapted to be installed within the ground and including a rotary pop-up nozzle and a mechanism for easily adjusting the speed of rotation of the nozzle, comprising a housing having an open top and a bottom from which projects an inlet coupling adapted to be connected to a liquid supply line, a cover for the top of said housing and including a central opening therein, a tubular nozzle stem rotatably mounted within said opening and adapted to pop upwards in response to water pressure within said housing, an impeller, means for mounting said impeller to said stem for free rotation in relation thereto, an arm member rigidly connected to said stem and extending outwardly therefrom, striker means pivotally mounted on said impeller for imparting successive impulses to said member for intermittently rotating said stem in a step-by-step manner, means defining an external liquid supply passageway for directing liquid from said inlet coupling through a driving port in said housng and towards said impeller for causing rotation thereof, means defining an external by-pass passageway for receiving and for directing the portion into said housing in a manner which is ineffective for rotating said impeller, and a speed adjusting screw threaded within said by-pass passageway and having a head accessible from the top of said sprinkler for controlling the flow through said by-pass passageway and thereby control indirectly the flow of liquid directed through said driving port toward said impeller for determining the speed of rotation of said impeller.

5. An irrigation sprinkler adapted to be installed within the ground and including a rotary pop-up nozzle head which is adapted to prevent dirt and the like from jamming the operation of the sprinkler, comprising a housing having an open top and a bottom from which projects an inlet coupling adapted to be connected to a liquid supply line, a cover for the top of said housing and including a central opening therein, a tubular sleeve mounted for vertical sliding movement within said opening and including a solid top which is positioned substantially flush with said cover when said sprinkler is inoperative, means defining an opening in the side wall of said sleeve for determining the angular spray coverage of said sprinkler, a tubular nozzle stem rotatably mounted within said sleeve and adapted to pop upwards with said sleeve in response to water pressure within said housing, said stem having a plurality of nozzle openings spaced around the top portion thereof and a corresponding plurality of pressure relief openings spaced adjacent said nozzle openings for balancing the fluid pressure acting against said stem within said sleeve and for preventing wear between said stem and said sleeve, an impeller horizontally disposed within said housing, means for mounting said impeller to said stem for free rotation in relation thereto, an arm member rigidly connected to said stem and extending outwardly therefrom, striker means mounted on said impeller for imparting successive impulses to said member for intermittently rotating said stem in a step-by-step manner, and passageway means for directing liquid from said inlet coupling through a driving port in said housing and towards said impeller for causing rotation thereof.

6. An irrigation sprinkler adapted to be installed within the ground and including a rotary pop-up nozzle and a mechanism for easily adjusting the speed of rotation of the nozzle, comprising a housing having an open top and a bottom from which projects an inlet coupling adapted to be connected to a liquid supply line, a cover for the top of said housing and including a central opening therein, a tubular sleeve mounted for a vertical sliding movement within said opening and including a solid top which is positioned substantially flush with said cover when said sprinkler is inoperative, means defining an opening in the side wall of said sleeve for determining the angular spray coverage of said sprinkler, a tubular nozzle stem rotatably mounted within said sleeve and adapted to pop upwards with said sleeve in response to water pressure within said housing, said stem having a plurality of nozzle openings spaced around the top portion thereof, said stem further having a corresponding plurality of pressure relief openings spaced adjacent said nozzle openings for balancing the fluid pressure acting against said stem within said sleeve and for preventing wear between said stem and said sleeve and for controlling the direction of leakage of liquid from around said stem, an impeller horizontally disposed within said housing, means for mounting said impeller to said stem for free rotation in relation thereto, an arm member rigidly connected to said stem and extending outwardly therefrom, striker means mounted on said impeller for imparting successive impulses to said member for intermittently rotating said stem in a step-by-step manner, passageway means for directing liquid from said inlet coupling through a driving port in said housing and towards said impeller for causing rotation thereof, and control means adjustably mounted within said passageway means and having a part accessible from the top of said sprinkler for controlling the flow of liquid through said passageway means and through said driving port toward said impeller for determining the speed of rotation of said impeller.

7. An irrigation sprinkler adapted to be installed within the ground and including a rotary pop-up nozzle and a mechanism for easily adjusting the speed of rotation of the nozzle, comprising a housing having an open top and a bottom from which projects an inlet coupling adapted to be connected to a liquid supply line, a cover for said housing and including a central opening therein, a tubular sleeve mounted for vertical sliding movement within said opening and including a solid top which is positioned substantially flush with said cover when said sprinkler is inoperative, means defining an opening in the side wall of said sleeve for determining the angular spray coverage of said sprinkler, a tubular nozzle stem rotatably mounted within said sleeve and adapted to pop upwards with said sleeve in response to water pressure within said housing, an impeller horizontally disposed within said housing, tubular stud means for mounting said impeller to said stem for free rotation in relation thereto, an arm member rigidly connected to said stem and extending outwardly therefrom, a vertically disposed pin extending upwards from said impeller, plastic striker means pivotally mounted for swinging movement on said pin for imparting successive impulses to said member for intermittently rotating said stem in a step-by-step manner, means defining a liquid supply passageway for directing liquid from said inlet coupling through a driving port in said housing and towards said impeller for causing rotation thereof, means defining a by-pass passageway for receiving a portion of the liquid flowing within said supply passageway and for directing the portion through a by-pass port into said housing in a manner which is ineffective for rotating said impeller, and control means mounted within said by-pass passageway and accessible from the top of said sprinkler for controlling the flow of liquid through said by-pass port and thereby controlling indirectly the flow of liquid through said driving port toward said impeller for determining the speed of said impeller.

8. An irrigation sprinkler adapted to be installed within the ground and including a rotary pop-up nozzle, comprising a housing having an open top and a bottom including means defining an inlet coupling adapted to be connected to a liquid supply line, a cover for the top of said housing and including a central opening therein, a tubular nozzle stem rotatably mounted within said opening and adapted to pop upwards in response to water pressure within said housing, an impeller horizontally disposed within said housing, means for mounting said impeller to said stem for free rotation in relation thereto, an arm member rigidly connected to said stem and extending radially outwardly therefrom and including a downwardly formed end portion, a plastic striker having a metal weight inserted in an end portion thereof, means for pivotally mounting the opposite end portion of said striker to said impeller to provide for swinging movement of said striker in relation to said impeller, means on said striker for engaging said downwardly formed end portion of said arm member to impart successive impulses to said member for intermittently rotating said stem in a step-by-step manner, and passageway means for directing liquid from said inlet coupling through a driving port in said housing and towards said impeller for causing rotation thereof.

9. A sprinkler as defined by claim 1 wherein said tubular nozzle stem includes a round opening for directing a main stream of liquid to obtain maximum radial coverage and a slot for directing a fan stream to cover an area closer to the sprinkler.

References Cited by the Examiner
UNITED STATES PATENTS

| | | | |
|---|---|---|---|
| 2,268,855 | 1/1942 | Brooks | 239—206 |
| 2,763,512 | 9/1956 | Porter | 239—206 |
| 3,117,724 | 1/1964 | Ray | 239—206 |

EVERETT W. KIRBY, *Primary Examiner.*